June 9, 1925.
K. F. MILES
SAW HEAD
Filed May 3, 1924
1,541,728
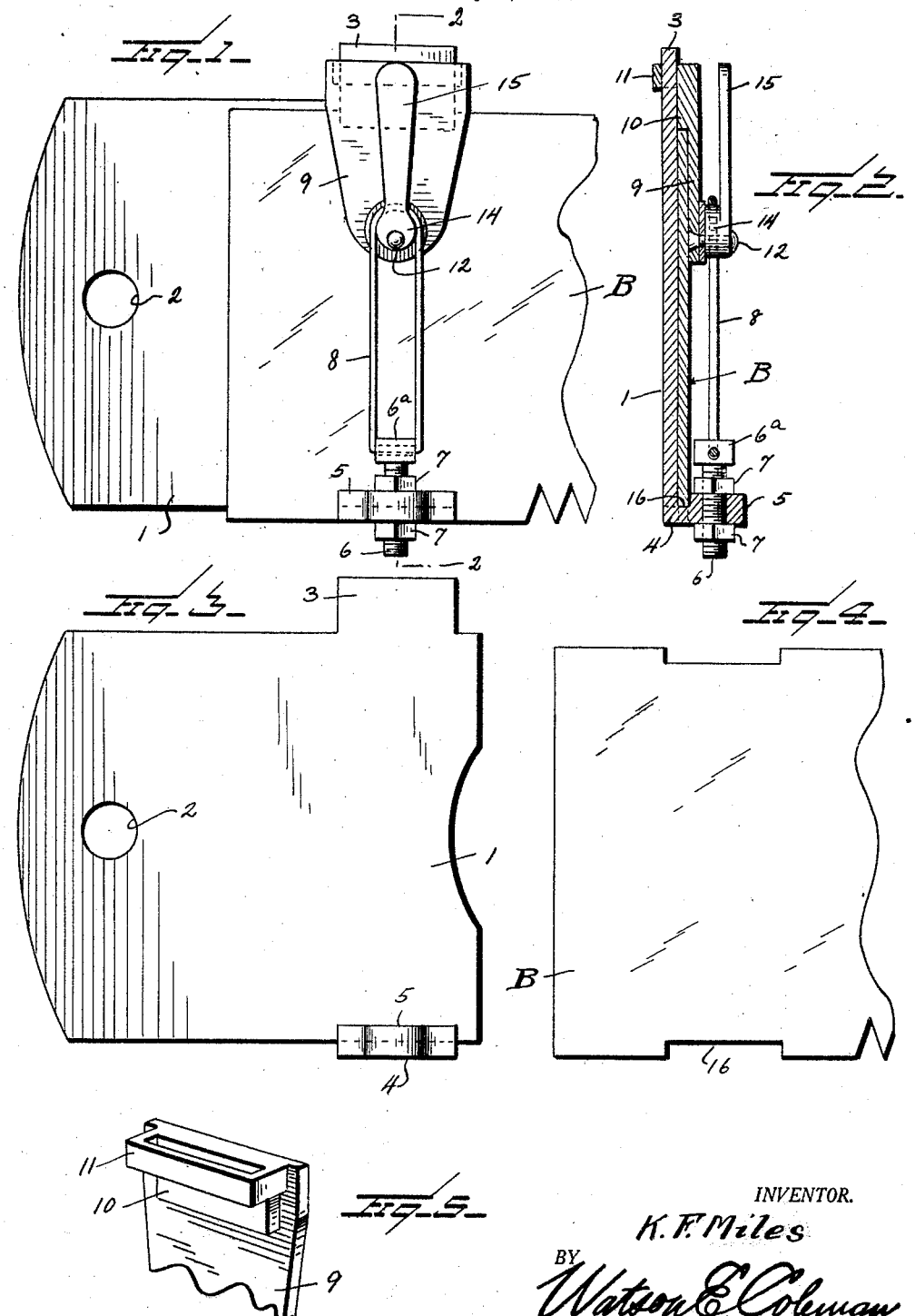
INVENTOR.
K. F. Miles
BY Watson E. Coleman
ATTORNEY.

Patented June 9, 1925.

1,541,728

UNITED STATES PATENT OFFICE.

KENNEY F. MILES, OF PORTLAND, OREGON.

SAW HEAD.

Application filed May 3, 1924. Serial No. 710,875.

*To all whom it may concern:*

Be it known that I, KENNEY F. MILES, a citizen of the United States, residing at Portland, in the county of Multnomah and State of Oregon, have invented certain new and useful Improvements in Saw Heads, of which the following is a specification, reference being had to the accompanying drawings.

This invention relates to certain improvements in saw heads and has relation more particularly to a device of this general character especially designed and adapted for use in connection with a power operated drag saw and it is an object of the invention to provide a device of this character with novel and improved means whereby the saw blade may be readily and effectively secured to the saw and in a manner whereby said blade can be reversed when desired.

The invention consists in the details of construction and in the combination and arrangement of the several parts of my improved saw head whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is an elevational view illustrating a saw head constructed in accordance with an embodiment of my invention, the associated saw blade being in fragment;

Figure 2 is a sectional view taken substantially on the line 2—2 of Figure 1;

Figure 3 is a view in elevation of the saw head with certain of the parts omitted;

Figure 4 is a view in elevation of the butt end of the saw blade coacting with the saw head;

Figure 5 is a fragmentary view in perspective of the sliding plate and parts carried thereby.

As disclosed in the accompanying drawings, my improved head comprises a plate 1 of requisite dimensions and provided adjacent one end thereof and at the transverse center of said plate with an opening 2 in which a pitman or other operating medium may be engaged with the head for imparting requisite reciprocation thereto.

The opposite end portion of the plate 1 is provided in a side margin thereof with an outstanding elongated lug or lip 3 while the opposite marginal portion of the plate 1 at a point diametrically opposed to the lug or lip 3 is provided with a relatively short lug or lip 4. Carried by said lug or lip 4 is an outstanding bracket 5 substantially at right angles to the plate 1 and freely disposed through said bracket 5 is a bolt 6. Threaded upon the bolt 6 and arranged at opposite sides of the bracket 5 for contact therewith are the locking or holding nuts 7. Through the medium of these nuts 7 the bolt 6 may be maintained in desired longitudinal adjustment with respect to the bracket 5.

As herein disclosed, the bolt 6 is disposed transversely of the plate 1 with the head $6^a$ thereof inwardly disposed. Pivotally engaged with the head is an elongated link 8 for a purpose to be hereinafter more particularly referred to.

An elongated and relatively narrow plate 9 is adapted to be disposed inwardly of the plate 1 and the outer end of said plate is provided thereacross with a flange 10 adapted to have direct contact with the plate 1 and the lug or lip 3. Depending from and carried by the flange 10 is a loop 11 through which the lug or lip 3 is freely disposed whereby the plate 9 may have movement along the lug or lip 3. The inserted end portion of the plate 9 is provided with an outstanding stub shaft 12 carrying an eccentrically mounted disc or wheel 14. Associated with this disc or wheel 14 is a crank or lever 15 whereby requisite rotary movement may be imparted to the disc or wheel. The link 8 hereinbefore referred to is disposed around this eccentric disc or wheel 14 and has close contact with the periphery thereof so that upon requisite rotation of the wheel or disc 14, the plate 9 may be moved inwardly of the plate 1 or permitted to have outward movement. The inner or butt end portion of the saw blade B is provided in its side marginal portions with the recesses 16 one of which being adapted, when the blade B is applied to the head, to receive the lower portion of the bracket 5 and the second of said recesses being adapted to receive the flange 10 carried by the plate 9 when said plate 9 is moved inwardly of the plate 1 to the desired extent.

The inner face of the bracket 5 is undercut to receive a marginal portion of the blade B at the base of a recess 16 while the plate 9 overlies and extends a material distance inwardly of the applied blade.

With the blade B secured to the head in a manner as hereinbefore disclosed, the blade B may be readily removed and replaced as desired and can also be conveniently reversed in accordance with the requirements of practice.

From the foregoing description it is thought to be obvious that a saw head constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In combination with a saw blade, a head therefor comprising a plate, an end portion of the blade being adapted to overlie the plate, said overlying portion of the blade being provided in its opposite margins with recesses, an outstanding bracket carried by the plate and adapted to be received within the recesses of the blade when the blade is in applied position with respect to the head, the plate of the head at the opposite side thereof being provided with an outstanding lug, a plate disposed transversely of the first plate and provided at its outer end with a depending flange adapted to be received within the second recess of the blade, said flange having a depending loop through which the lug is freely disposed to permit said second plate to have movement toward or from the first named plate and to an extent to free the flange carried by said second plate from the adjacent recess in the plate, and coacting means carried by the bracket and second plate for moving said second plate inwardly of the first plate.

2. In combination with a saw blade, a head therefor comprising a plate, an end portion of the blade being adapted to overlie the plate, said overlying portion of the blade being provided in its opposite margins with recesses, an outstanding bracket carried by the plate and adapted to be received within the recesses of the blade when the blade is in applied position with respect to the head, the plate of the head at the opposite side thereof being provided with an outstanding lug, a plate disposed transversely of the first plate and provided at its outer end with a depending flange adapted to be received within the second recess of the blade, said flange having a depending loop through which the lug is freely disposed to permit said second plate to have movement toward or from the first named plate and to an extent to free the flange carried by said second plate from the adjacent recess in the plate, an eccentric carried by the second plate and provided with operating means, a link operatively connected with the bracket and disposed around the eccentric.

3. In combination with a saw blade, a head therefor comprising a plate, an end portion of the blade being adapted to overlie the plate, said overlying portion of the blade being provided in its opposite margins with recesses, an outstanding bracket carried by the plate and adapted to be received within the recesses of the blade when the blade is in applied position with respect to the head, the plate of the head at the opposite side thereof being provided with an outstanding lug, a plate disposed transversely of the first plate and provided at its outer end with a depending flange adapted to be received within the second recess of the blade, said flange having a depending loop through which the lug is freely disposed to permit said second plate to have movement toward or from the first named plate and to an extent to free the flange carried by said second plate from the adjacent recess in the plate, an eccentric carried by the second plate and provided with operating means, a member adjustably disposed through the bracket, and a link secured to said member, said link being disposed around the eccentric.

In testimony whereof I hereunto affix my signature.

KENNEY F. MILES.